(12) United States Patent
Schmidt et al.

(10) Patent No.: US 6,489,733 B1
(45) Date of Patent: Dec. 3, 2002

(54) MULTI-PURPOSE LIGHTING SYSTEM FOR AIRPORTS, ROADS OR THE LIKE

(75) Inventors: Helmut Schmidt, Roettenbach (DE); Lothar Belger, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/693,886

(22) Filed: Oct. 23, 2000

Related U.S. Application Data

(63) Continuation of application No. PCT/DE97/01117, filed on Apr. 14, 1999.

(30) Foreign Application Priority Data

Apr. 21, 1998 (DE) .......................................... 198 17 782

(51) Int. Cl.$^7$ .............................. G06F 1/26; G06F 1/28; G06F 1/30
(52) U.S. Cl. ........................ 315/312; 315/292; 315/320
(58) Field of Search .................................... 315/292–296, 315/312, 314, 316, 318, 320, 324, 360, 362, 291

(56) References Cited

U.S. PATENT DOCUMENTS

| | | | |
|---|---|---|---|
| 4,590,471 A | 5/1986 | Pieroway et al. | 340/825.69 |
| 4,716,344 A | * 12/1987 | Newell et al. | 315/294 |
| 4,924,364 A | 5/1990 | Pannier | 362/285 |
| 6,138,241 A | * 10/2000 | Eckel et al. | 315/320 |

FOREIGN PATENT DOCUMENTS

| | | |
|---|---|---|
| DE | 4127254 A1 | 2/1993 |
| DE | 4232618 A1 | 3/1994 |
| EP | 0069470 | 1/1983 |
| EP | 0558349 A1 | 9/1993 |
| EP | 0723384 A1 | 7/1996 |
| EP | 0753986 A2 | 1/1997 |
| EP | 0900882 A2 | 3/1999 |
| GB | 2174852 A | 11/1986 |
| WO | WO 90/04242 | 4/1990 |

* cited by examiner

*Primary Examiner*—Don Wong
*Assistant Examiner*—Wilson Lee
(74) *Attorney, Agent, or Firm*—Sughrue Mion, PLLC

(57) ABSTRACT

A lighting system, which may be used, for example, as an airport lighting system, as a street lighting system, as an obstruction warning light, as an illuminated sign, as a warning light, or as a signal light or the like. The lighting system includes a device for monitoring and controlling its light sources or groups of light sources. The light sources have at least one respective lighting unit, with which a transceiver device is associated. The transceiver device includes a microcontroller and is, via a power supply line and a router, connected to a central station. The central station includes a transceiver part and a control computer and supplies the transceiver device with control commands. To ensure that larger lighting systems can be safely operated with a comparatively low expenditure, the microcontrollers of each lighting unit are components of a decentralized control device. The decentralized control device includes application-specific components, such as switching components, monitoring components, and adjustment components. Therein, the larger lighting systems include a plurality of light sources that are to be controlled and regulated on an individual basis. The transceiver device is structured as a module part disposed on a sickle-shaped printed circuit board and disposed next to the lighting unit.

23 Claims, 11 Drawing Sheets

MULTI-PURPOSE LIGHTING SYSTEM FOR AIRPORTS, ROADS OR THE LIKE

This is a Continuation of International Application PCT/DE99/01117, with an international filing date of Apr. 14, 1999, the disclosure of which is incorporated into this application by reference.

FIELD OF AND BACKGROUND OF THE INVENTION

This invention relates to a lighting system, which may be used, for example, as an airport lighting system, as a street lighting system, as an obstruction light, as an illuminated sign, as a warning light, or as a signal light or the like.

German Patent DE-A-42 32 618 and International reference WO 90/04242 A teach a lighting system, which includes a unit for monitoring and controlling light sources or groups of light sources of a lighting system. These light sources may be designed as blister lights. Each of these light sources has at least one lighting unit. This lighting unit is associated with a transceiver device, which is equipped with a microcontroller. Via the power supply line of the lighting system, the transceiver device is connected with a central station, which can selectively control the microcontroller of the respective transceiver device. For this purpose, the central station is equipped with a transceiver unit and a control computer. The microcontroller of each lighting unit is part of a decentralized control device, which includes application-specific components, e.g., switching elements, monitoring elements, and adjusting elements. In addition, in the lighting system disclosed in WO 90/04242 A, each transceiver device is embodied as a module part. This module part includes switching components and monitoring components, which are connected upstream from the microcontroller and the lighting unit of the blister light.

A similar lighting system is disclosed in European Patent EP-A-0 723 384. This lighting system is designed as a safety lighting system, wherein, in case of a power failure, the individual light sources of the lighting system are supplied with battery power. For this purpose, each of the light sources or each group of light sources is associated with a change-over switch device. In case of a power failure, the change-over switch device permits a switch over to battery operation. In this safety lighting system, the change-over switch devices of the light sources or of the groups of light sources are part of a decentralized control unit. Therein, the control unit includes power-on elements, power-off elements, and monitoring elements.

European Patent EP-A-0 900 882 discloses a lighting system, which includes blister lights and which is intended for traffic control. In these blister lights, light emitting diodes are used as the lighting unit. Via connection leads, each individual light emitting diode is connected to a printed circuit board, which is arranged at a location remote from the light emitting diodes. Furthermore, drive components are provided in the blister lights, which drive the light emitting diodes.

U.S. Pat. No. 4,924,364 discloses a blister light for airports. Therein, the lighting unit is an electric lamp, which, together with the optical unit of the blister light, can be separated from the remaining components of the blister light. For this purpose, an optical block, which includes the electric lamp, is vertically removed from the blister light.

OBJECTS OF THE INVENTION

It is one object of the present invention to improve a lighting system, such as the one known from the above referenced WO 90/04242 A, so as to permit a more compact design of the blister lights or of the light sources.

SUMMARY OF THE INVENTION

This and other objects are achieved by a lighting system, which includes a plurality of blister lights, which, in turn, have at least one respective lighting unit. The lighting system furthermore includes a device for monitoring and controlling the blister lights. A transceiver device, which includes a microcontroller, is associated with the lighting unit. In addition, the system includes a central station, which has a transceiver part and a control computer. The central station is connected to the transceiver device via a power supply line and a router and is configured to supply control commands to the transceiver device. The microcontroller is structured as a component of a decentralized control device, which includes application-specific components. Each transceiver device is structured as a module part; wherein the module part has switching components and monitoring components, which are connected upstream from the microcontroller and the lighting unit of the blister light. The switching components and the monitoring components of the module part are disposed on a sickle-shaped printed circuit board. The module part is disposed next to the lighting unit and at the same level as the lighting unit of the blister light.

The inventive embodiments of the printed circuit board and the arrangement of the module part at the level of the lighting unit allow for a flatter design of the blister lights or light sources than achieved in the prior art.

Lighting systems according to the invention are well suited for small airports, heliports, mobile airport equipment, field airstrips, landing places or the like. In addition, the lighting system according to the invention is advantageously applied in street lighting systems, e.g., to indicate temporary traffic lane changes or the like.

If the lighting unit of the lighting s stem according to the invention is formed by a plurality, or a cluster, of light emitting diodes (LEDs), the power supply of the individual lighting units can be reduced. The life span of the lighting units thus designed is significantly increased, so that the maintenance intervals of the lighting system are increased too. This results in significantly reduced maintenance costs. Due to the lower power consumption and maintenance expenditure, the lighting systems according to the invention can be operated much more cost-effectively than conventional lighting systems of this type. As an alternative to the embodiment of the lighting units as light emitting diodes (LEDs), the lighting units may also be formed by light emitting polymers, which provide similar advantages.

To further reduce the technological complexity for controlling and monitoring the lighting systems according to the invention, it is advantageous if the decentralized control units of the lighting system are designed as a LON (Local Operating Network).

In a preferred embodiment of the invention, the microcontroller is designed as a one-chip controller, which provides significant savings with respect to the technical-structural complexity and with respect to costs.

The microcontroller advantageously includes an EEPROM; a RAM; three CPUs; a clocking-and-control-block, which has clock/timer elements; an application input/output block; and a communications port. The EEPROM, the RAM, the three CPUs, the application input/output block, and the communications port are interconnected by means of an internal address bus and by means of an internal data bus. The EEPROM, the RAM, the three CPUs, the application input/output block, the communications port, and the clocking-and-control-block are interconnected by means of a timing-and-control circuit.

Advantageously, the EEPROM of the microcontroller has a memory capacity of 512 bytes and is capable of storing network parameters and application programs.

It is advantageous, if each of the three CPUs of the microcontroller is designed as an 8-bit CPU. Thereby, one of the three CPUs of the microcontroller can be used for application programs.

The two other CPUs of the microcontroller can be used for LONTALK protocol processing, wherein the processable protocols include all seven layers of a reference model in accordance with ISO/OSI standards.

The application input/output block can advantageously be used as a parallel interface to an external microprocessor, which has eight data lines and three control lines.

According to one embodiment of the invention, the application input/output block of the microcontroller has a 16-bit load register, a counter, a buffer memory (latch), a clock source, four 20 mA sink current pins, four programmable pull-ups, and possibly additional elements.

The communications port of the microcontroller is advantageously provided with five network interface pins to connect the microcontroller to a base band medium, e.g., to a two-wire cable, or to an external transceiver.

The microcontroller can have a low voltage detector circuit and a low voltage reset circuit to prevent faulty operation or malfunctions of the EEPROM if the applied voltage is lower than 4.1 VDC+/−300 mV tolerance.

If the microcontroller does not have a ROM, it is advantageous to equip the microcontroller with an external memory interface. In this case, the RAM of the microcontroller can advantageously have a memory capacity of 2048 bytes.

According to a further embodiment of the invention, the microcontroller has a RAM with a memory capacity of 1024 bytes or 2048 bytes and a ROM with a memory capacity of 10240 bytes.

Each microcontroller has an unambiguous, non-erasable identification number to link the respective function state of the lighting unit with an address that has preferably 48 bits and for which the 6 bytes of the EEPROM can be used.

Advantageously, the microcontroller has a service pin to permit an effective network installation.

In a preferred embodiment of the invention, each blister light has a light intensity regulating circuit, which sets a predetermined desired lighting-means-current-value via a pulse width modulation element and which readjusts the actual value.

It is advantageous if this light intensity regulating circuit is implemented for load-dependent compensation and for line-length compensation of the dropout voltage or the voltage drop.

It is advantageous if a switching power supply is provided, which has a toroidal-core transformer as an isolating element. The toroidal-core transformer, together with the pulse width modulation element, determines the transmitted power.

In addition, it is advantageous to provide each blister light with an isolation circuit, which produces a rapid isolation between the transceiver device and the power supply line if unacceptable currents occur. In addition, the isolation circuit terminates this isolation after the disturbance has been repaired, e.g. through replacement of the lighting unit.

A measurement circuit is provided, via which an isolation and a reconnection can be detected by the microcontroller.

It is advantageous if, via the measurement circuit, all lighting units functions are detected and input into the microcontroller, where the actual lighting unit values are compared with the desired lighting unit values.

If light emitting diodes (LED) are used for the blister lights, it is advantageous if each blister light has a supply circuit, by means of which the lighting unit current is adjusted to the supply voltage.

It is advantageous if each blister light has a regulator circuit, whereby a signal can be generated by means of which the actual functional state of the lighting unit is fed back to the central station via the power supply line. Such an actual functional state of the lighting unit can be, for example, a lighting unit defect, a line interruption, or a short-circuit.

In another preferred embodiment of the present invention, each blister light is provided with a further supply circuit for the microcontroller, which guarantees that, in case of defects in the lighting circuit, a differentiated message is transmitted to the LON.

In an advantageous embodiment of the invention, functional data on the state of the individual circuits of a respective transceiver device are reported to the central station by means of the microcontroller. This leads to considerable savings in maintenance and repair.

To further facilitate maintenance and repair, it is advantageous for the individual blister lights to be detachably connected by a cable to the main power supply line. In particular, such a detachable connection is preferably a watertight first plug connection, which is preferably implemented as an earthed plug connection.

The lighting unit of the blister light can include an internal second plug connection, which is preferably implemented as a two-pole FAA plug connection. By means of the internal second plug connection, the lighting unit is connected to upstream elements of the blister light.

Advantageously, the individual blister lights are removable from their seats below ground and can be isolated from the main power supply line by means of the first plug connection.

The association of individual blister lights with predetermined blister light groups or blister light chains, which association can be configured via the power supply line, ensures great variability and adjustability of the airport lighting system or street lighting system to various requirements.

To provide conformity with standards used in Europe, communication on the power supply line should be performed in the C-band in accordance with CENELEC.

It is advantageous if the blister lights are parallel-connected to the power supply line.

To simplify the assembly of the blister lights, the microcontroller and the additional switching components and monitoring components, which are connected upstream from the lighting unit of each blister light, are positioned on a printed circuit board. This printed circuit board is adapted to the shape of a housing of the blister light and is fastened in the blister light in a shock-proof and vibration-proof manner.

For this purpose, it is advantageous if the module part of each blister light is connected to the power supply line by means of the detachable first plug connection, and if the module part of each blister light is connected to the lighting unit of the blister light by means of the internal plug connection. Therein, the detachable first plug connection is preferably implemented as a watertight connection.

To avoid interference in the received signal, it is advantageous if the module part of each blister light has a metallic, grounded housing.

To prevent moisture from penetrating into the module part, which could lead to malfunctions of the blister light, it is advantageous if the module part is watertight-embedded in plastic, for example. In this case, an unconnected cable end is provided for each of the two plug connections.

The lighting system according to the invention allows for almost potential-free operation of the blister lights with minimal power consumption. In standby operation, the power consumption is even further reduced.

BRIEF DESCRIPTION OF THE DRAWINGS

Preferred embodiments of the present are shown in the drawings, in which.

DETAILED DESCRIPTION OF THE PREFERRED EMBODIMENTS

The following is a description of an exemplary embodiment of the lighting system according to the invention as an airport lighting system. However, the lighting system according to the invention can also be embodied as a street lighting system, as an obstruction warning light, as an illuminated sign, as a warning light, or as a signal light or the like. Therein, the lighting system can include a plurality of light sources or a plurality of light source groups.

Figure 1:
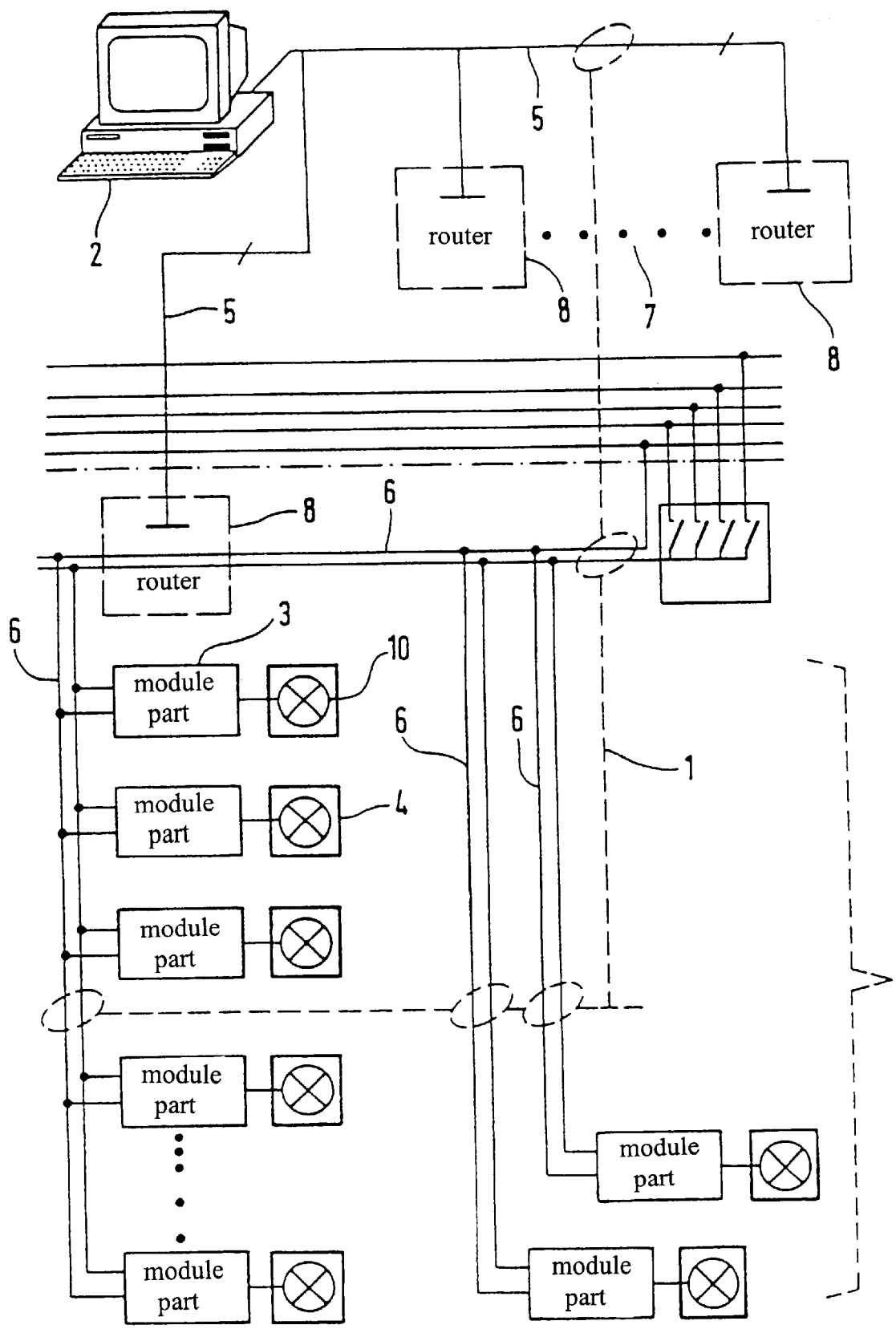
FIG. 1 shows a principle representation of a device for monitoring and controlling a lighting system according to the invention.

In the embodiment presented, the lighting system according to the invention has a device for monitoring and controlling blister lights, as depicted in principle in FIG. 1.

Figure 2:
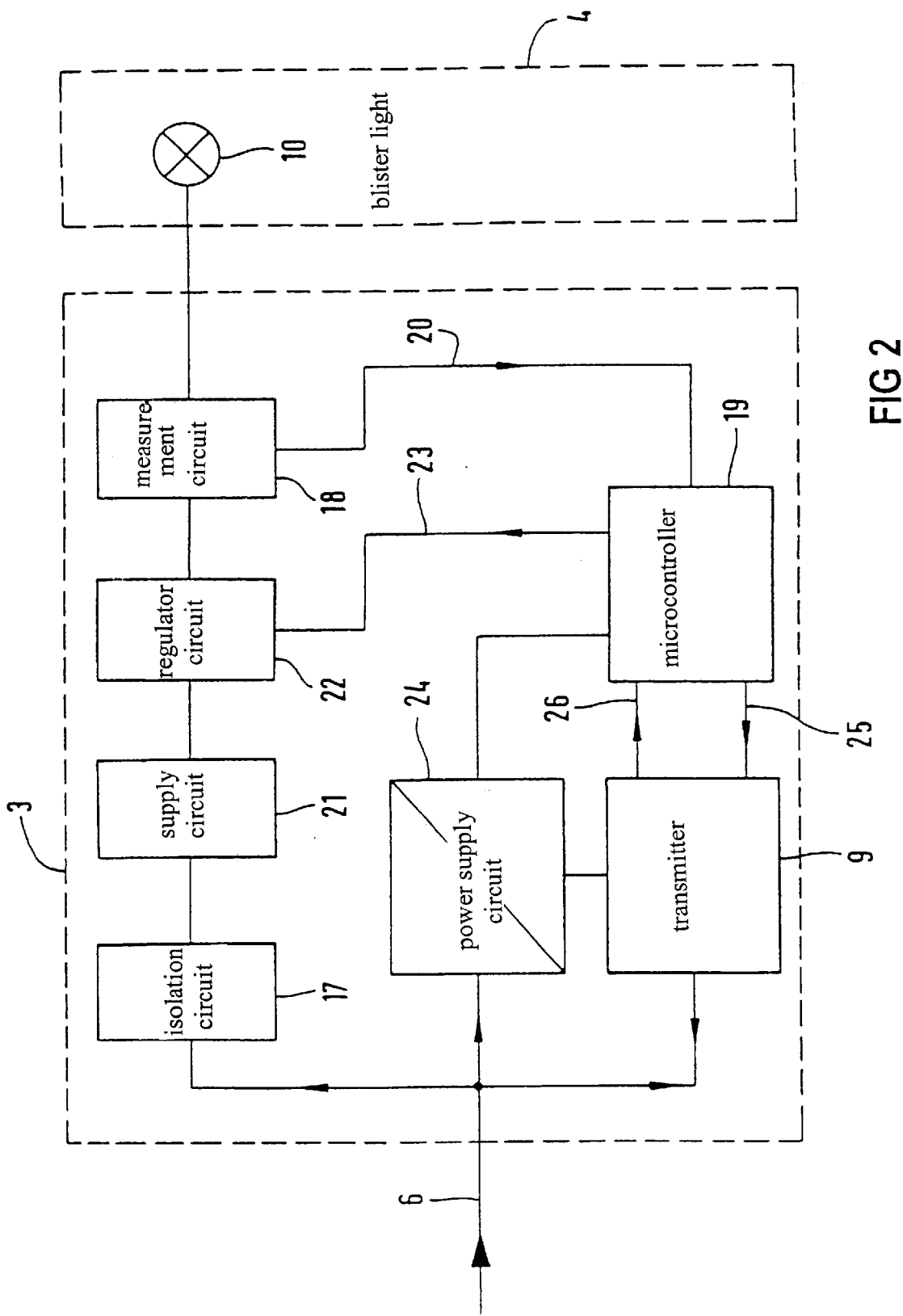
FIG. 2 shows a block diagram of a module part and of a lighting unit of a blister light.

In the exemplary embodiment, the device performs a data communication function within a LON (local operating network) 1, a controlling and monitoring function by means of a central station, and additionally serves as a module part 3, which is depicted in detail in FIG. 2. Each blister light has one such module part 3. Therein, the central station is implemented as a PC 2.

The data communication between the module part 3 of the blister light 4 and the PC 2, which forms the central station, is realized in the LON.

All seven ISO/OSI protocol steps are fulfilled, as they are implemented in the hardware and software of the microprocessors, which are used in the device for monitoring and controlling the blister lights.

Various communications media, which can be combined and mixed with one another, can be selected. For example, light waveguides, twisted two-wire lines (TWP) 5, a power supply network 6, and radio links 7 can be used as communications media.

The transmission method is based on a differential Manchester code with bit synchronization. The bit synchronization can be tailored to the respective communication medium. Collision avoidance is ensured by a CSMA method with access priorities. Priorities can be assigned for important messages.

Routers 8 ensure the transition between the various communications media.

Within operational buildings, the data communication is preferably performed via twisted two-wire lines 5 because a high transmission rate is necessary. In the case of low-voltage main distributors, routers 8 are installed, by means of which data protocols can be coupled into one or more of the supply networks 6. A star-shaped or radial power supply into the level or plane of the distributor can thus be performed in low voltage networks, which are spread out over a large area, wherein, if necessary, medium voltage transformers are interconnected.

Transformers 9 to the power supply line 6, which are shown in FIG. 2 and which are provided in the module part 3 of the blister light 4, as well as the routers 8 communicate with the LON 1 via the twisted two-wire lines 5 in the C-band, which is approved in Europe in accordance with CENELEC.

The PC 2, which forms the central station, assumes the central configuration, control, and monitoring of the lights of the blister lights 4 via the module part 3. Therein, the light can have several lighting units 10. Without hierarchy, several PCs 2 can be integrated into the LON at various places. In this case, these PCs can operate redundantly and they can monitor each other.

Remote access via modem connections or ISDN is possible.

Figure 3:
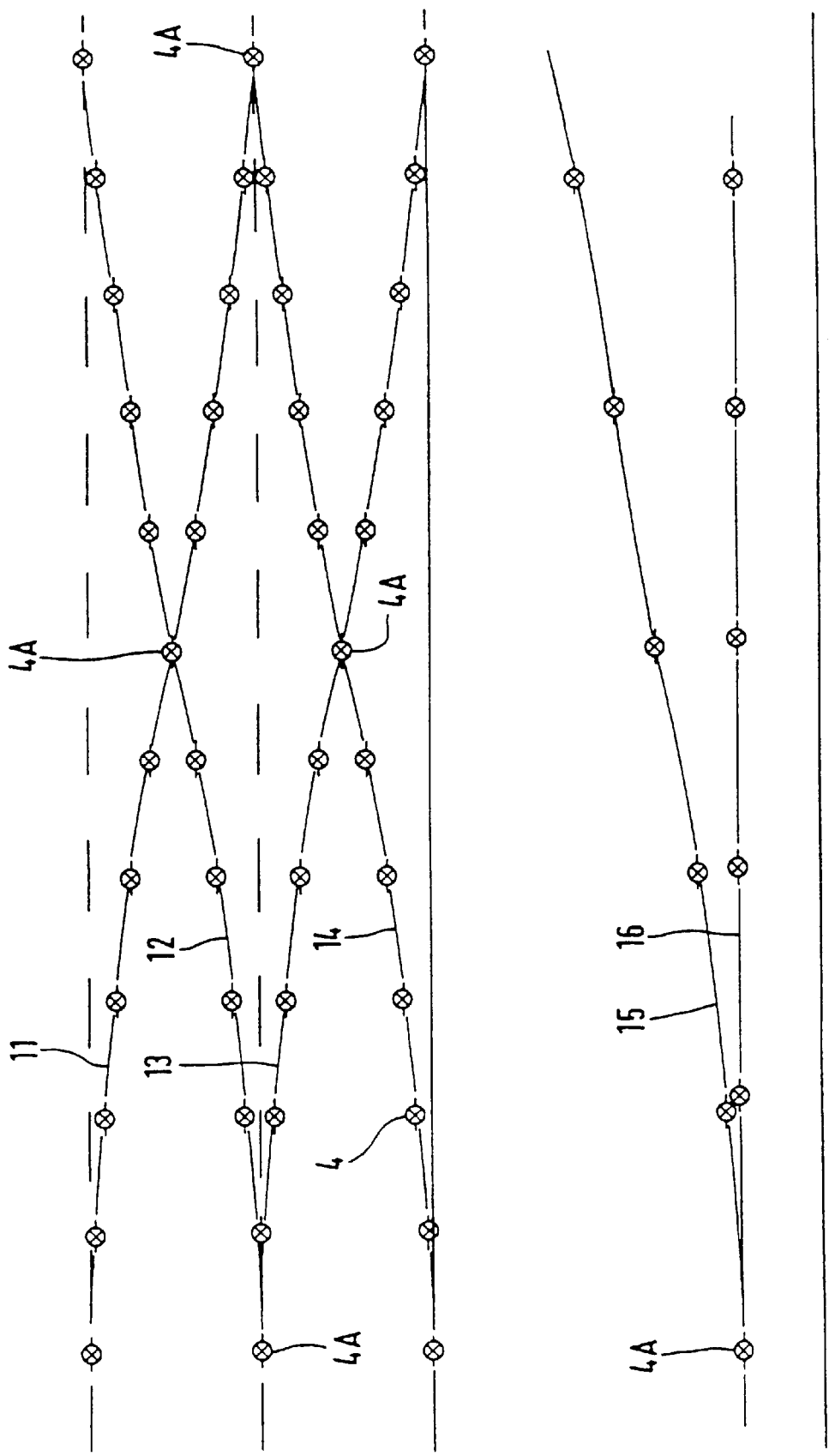
FIG. 3 shows the spatial arrangement of blister lights, wherein multiple-associated blister lights are provided.

After the random installation of the module parts 3, each module part 3 is configured by the PC 2 with regard to its association with blister light chains 11, 12, 13, 14, 15, and 16, which are depicted in FIG. 3. The respective data are loaded into each module part 3 of the blister lights 4, where they are permanently saved. Due to the overlapping blister light chains 11, 12, 13, and 14, blister lights 4A are provided, which are associated with various blister light chains and blister light chain groups.

A graphic interface of the PC 2 assumes the depiction of the module parts 3, whereby various colors of the symbols of the module parts 3 signal various operational and error states of the module parts 3, together with their connected lighting units 10.

A history function allows the operation time of all module parts 3 and their associated lighting units 10 to be detected, and automatically provides maintenance messages concerning the need to replace the lighting units 10. Therein, the work function of the lighting unit is used as a basis, since an operation of the lighting unit below nominal levels increases the life span of the lighting unit. All history and maintenance data are deposited in a data file, which can be output from the system of the device. With the PC 2, operating times, error messages, and selection messages of the module parts 3 can be freely summarized and ordered in groups and according to priority. Via data communication with other supervisory maintenance computers, these data can be further processed and automatically supplied to the maintenance facilities.

Using the PC 2, the assembly date of the respective lighting unit 10 and the total operating time, which has occurred, can be determined from each module part 3 on the basis of the operational history.

A "service terminal" function is provided to replace defective module parts 3, by means of which the data from the defective module part 3 are assigned to the new module part 3 by the PC 2. Hence, the work within the airport lighting system is exclusively restricted to changing the module part 3.

For test purposes, the PC 2 can control the module parts 3 individually with variable illuminances.

Via the PC 2, a master computer can invoke freely programmable scenarios with respect to the control of the blister light chains 11, 12, 13, 14, 15, and 16. On the other hand, the PC 2 can simultaneously function as the master computer. By an RS 232 interface, for example, a computer link to external systems is ensured.

The module part 3, which is depicted in FIG. 2 as a block diagram, controls and monitors one lighting unit 10 of a blister light 4 at a time.

In case of unacceptable currents, an isolation circuit 17, which is serially connected to the lighting unit 10, ensures a rapid isolation of the lighting circuit section, which is arranged downstream from the isolation circuit, and the lighting unit 10 of the blister light 4. The lighting unit 10 of the blister light 4 is arranged downstream from the isolation circuit too. After a disturbance is repaired, e.g., by replacing the lighting unit, the isolation circuit 17 switches the lighting circuit back on.

Via a measurement circuit 18, a microcontroller 19 detects the isolation of the lighting circuit downstream from the isolation circuit 17 because, via a connecting line 20, an unacceptable deviation of the actual value from the desired value is present in the microcontroller 19. By means of the transmitter 9, this unacceptable deviation is available in the power supply line 6 or in the LON 1. The same function applies to the return of the lighting circuit from the disturbance, e.g., after the replacement of the lighting unit is completed.

If light emitting diodes (LEDs) are used, a supply circuit 21 adapts the lighting unit voltage to the supply voltage. In a lighting circuit of this type, a potential isolation can be provided.

A regulator circuit 22 influences the level of the current flowing through the output, wherein the lighting circuit is terminated by the lighting unit 10. Via a connecting line 23, the regulator circuit 22 receives its manipulated variable from the microcontroller 19. In the microcontroller 19, a continuous comparison of the desired value with the actual lighting unit current value is performed. Thereby, the actual fed back lighting unit current value is checked and, via the transmitter 9, the actual functional state of the lighting unit 10 is reported to the power supply line 6 and/or the LON 1.

The microcontroller 19 contains a permanently saved network address of the module part 3. In the microcontroller 19, the lighting unit functional state is provided with this address so that proper identification in the PC 2, which forms the central station, is ensured.

The lighting unit serial circuit includes the isolation circuit 17, the supply circuit 21, the regulator circuit 22, and the measurement circuit 18. A second power supply circuit 24, which operates separately or isolated from the lighting unit serial circuit, supplies power to the microcontroller 19 and to the transmitter 9. Thereby, the second power supply circuit 24 ensures that a differentiated message is transmitted to the LON 1 or to the power supply line 6, if defects occur in the lighting unit serial circuit, e.g., if a separation or isolation of the lighting unit serial circuit occurs.

The desired functional operating state, which the microcontroller 19 receives, via the transmitter 9, as an instruction from the supply network 6 or the LON 1 (e.g. from the PC 2), is acknowledged by the microcontroller 19 via a connecting line 26. The microcontroller 19 carries out the instruction and reports the actual state of the functional data, together with an address, via a connection line 25 and via the transmitter 9 into the LON 1.

In the case of the airport lighting system, which is herein depicted and described as an example for the lighting system according to the invention, the module part 3 is configured as a transceiver device of the blister light 4. The module part 3 is depicted in principle in FIG. 2. Via the LON 1, via the routers 8, and via the twisted two-wire lines 5, the module part 3 is connected to the PC 2. The PC 2, which functions as the central station, includes a corresponding transceiver part and a control computer.

In a preferred embodiment of the present invention, the microcontroller 19 of the module part 3 is implemented as a one-chip controller. The microcontroller 19 includes an EEPROM 27; a RAM 28; three CPUs 29, 30, and 31; a clocking-and-control-block 32; an application input/output block 33; and a communication port 34, which can be connected to the LON via the transmitter 9. The transmitter 9 is described in the text that corresponds to FIG. 2.

The EEPROM 27; the RAM 28; the three CPUs 29, 30, and 31; the application input/output block; and the communication port 34 are connected to one another by means of an internal 16-bit address bus 35 and by means of an internal 8-bit data bus 36.

The EEPROM 27; the RAM 28; the three CPUs 29, 30, and 31; the application input/output block 33; the communication port 34; and the clocking-and-control-block 32 are connected to one another by means of a timing and control line 37.

The EEPROM 27 of the microcontroller 19 has a memory capacity of at least 512 bytes. In the EEPROM 27, network parameters and application programs are saved.

In a preferred embodiment, each of the three CPUs 29, 30, and 31 of the microcontroller 19 is implemented as an 8-bit CPU. The first CPU 29 is configured for application programs.

The two other CPUs 30 and 31 of the microcontroller 19 are configured for LONTALK protocol processing.

The application input/output block 33 of the microcontroller 19 has eleven input/output terminals 38 to 45 and 46 to 48. If the application input/output block 33 is used as a parallel interface to an external microprocessor, the eight terminals 38 to 45 are configured as data lines and the three terminals 46 to 48 are configured as control lines.

The application input/output block 33 has a 16-bit loading register, a counting device, a latch, a clock source, four 20 mA sink current pins, four programmable pull-ups, and, if necessary, further elements.

The communication port 34 of the microcontroller 19 has five network interface pins 49, by which the communication port 34 is connected to a base band medium, such as twisted two-wire lines, or to an external transceiver.

The clocking-and-control-block 32 has a control block 50 and a clock/timer block 51. In addition, the microcontroller 19 can include a low voltage detector circuit and a low voltage reset circuit 52.

The latter prevents faulty operation or false EEPROM values if the applied voltage is below a minimum voltage.

The control block 50 of the service block 32 has a reset terminal and a service terminal.

The clock/timer block 51 includes a terminal, via which standard clock inputs of 20 MHz, 10 MHz, 5 MHz, 2.5 MHz, 1.25 MHz, and 625 kHz can be input.

In addition, two programmable 16-bit counters or 16-bit timers are provided.

In the present embodiment of the microcontroller 19, the microcontroller 19 can be connected to an external memory interface 53. In this embodiment, the RAM 28 of the microcontroller 19 has a memory capacity of 2048 bytes.

Figure 4:
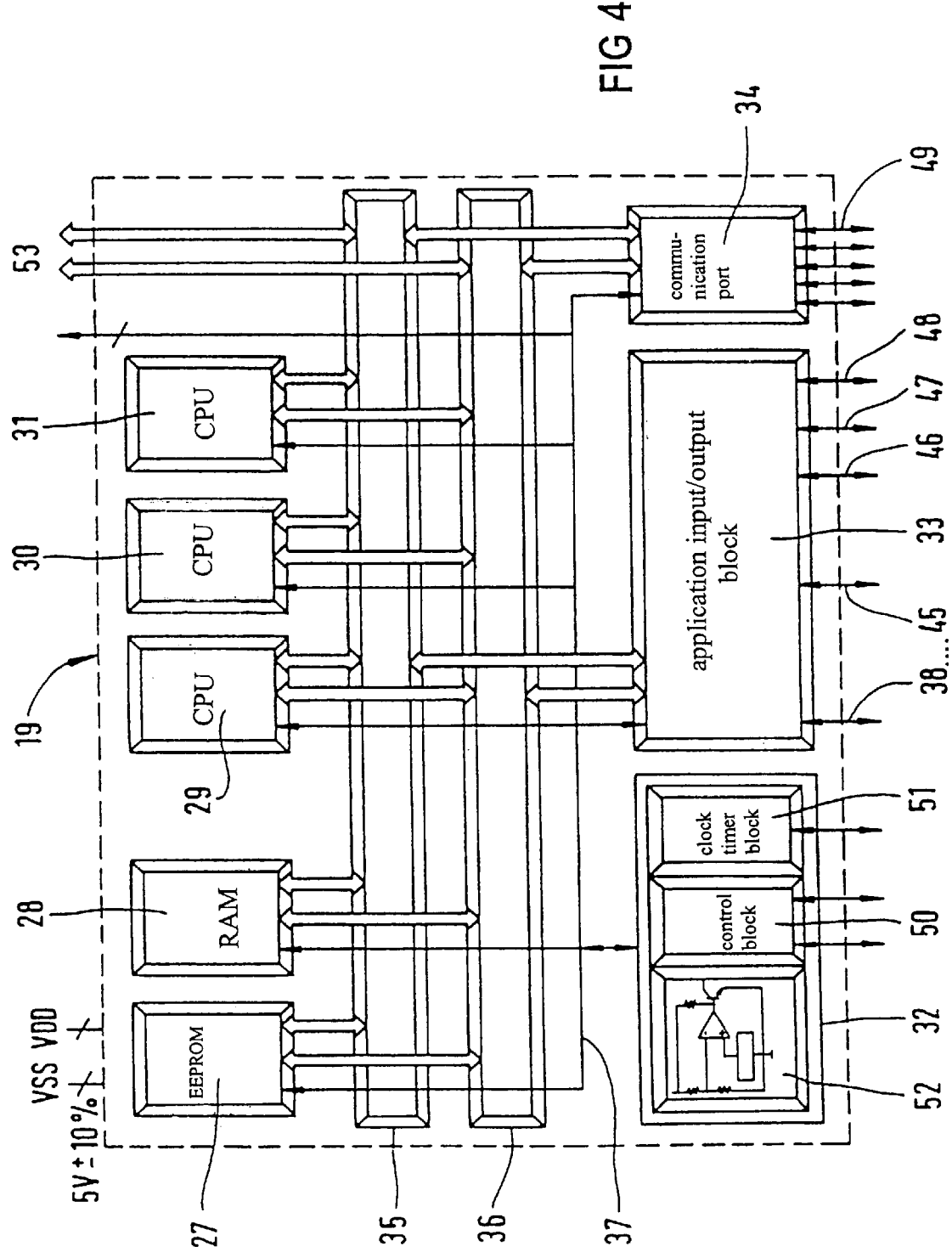
FIG. 4 shows a microcontroller of a blister light of the lighting system according to the invention.

In a further embodiment of the microcontroller 19, which is not depicted in FIG. 4, no terminal to an external memory interface is provided. In this embodiment, the RAM 28 of the microcontroller 19 has a memory capacity of 1024 bytes. An additional ROM is provided in the microcontroller 19, which has a memory capacity of 10,240 bytes.

In the microcontroller 19 of each module part 3, a unique, permanently saved identification number is deposited, by which a network address of the respective lighting unit 10 of the blister light 4 can be linked. The identification number has 48 bits. Therein, six bytes of the EEPROM 27 can be used for the identification number.

In addition, the microcontroller 19 includes a service pin.

Figure 5:
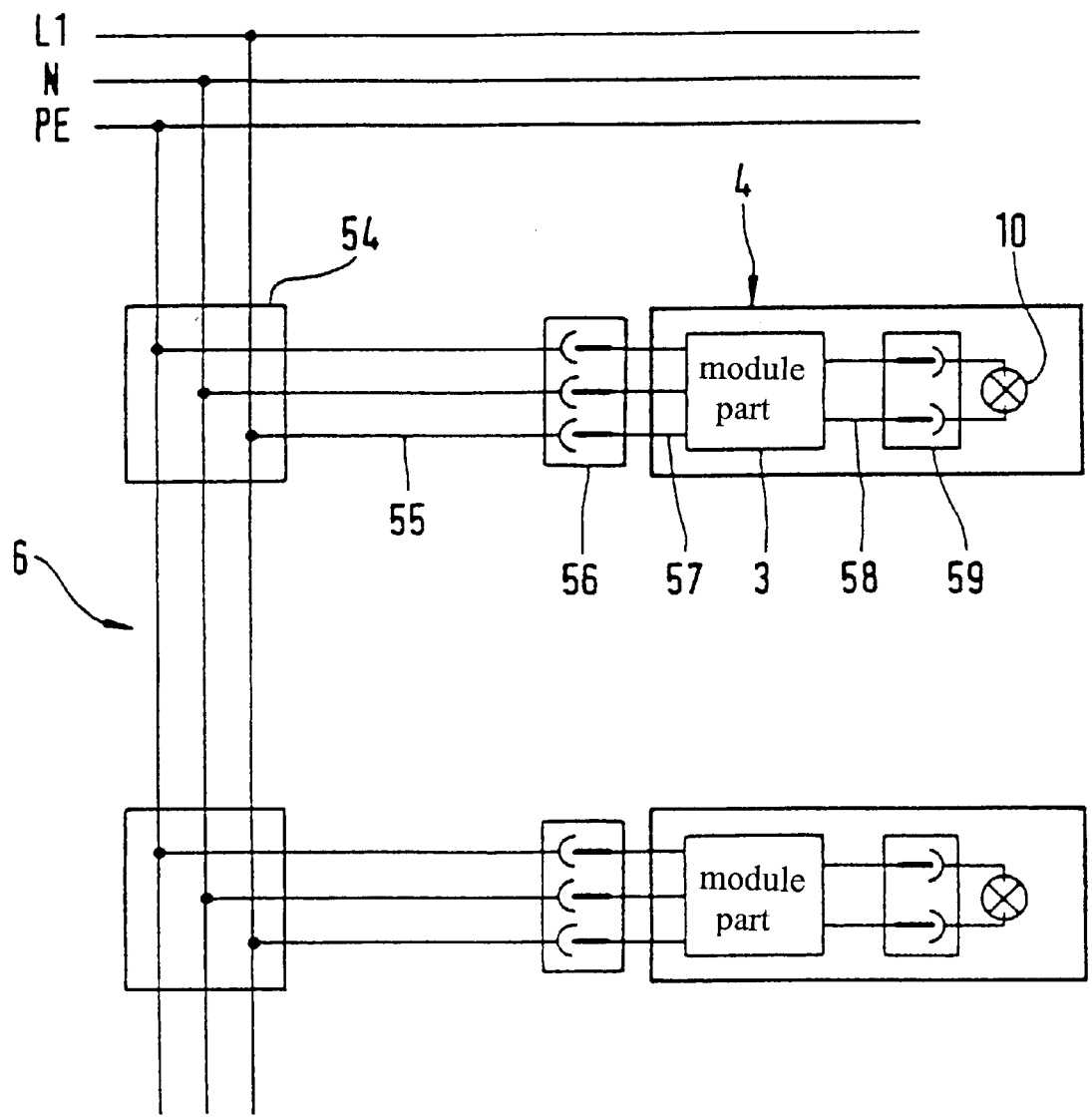
FIG. 5 shows a principle representation of the blister light and its connection to the power supply line.

FIG. 5 shows the connection of a blister light 4 to the power supply line 6. A coupler or branch 54 is provided at the power supply line 6, whose branching cable section 55 is connected with the module part 3 of the blister light 4 via a watertight first plug connection 56. This first plug connection is implemented as an earthed plug connection. For this purpose, the module part 3 has a cable section 57, the free end of which is provided with the first plug connection 56, which, in turn, faces a side the module part.

At the side facing the lighting unit 10 of the blister light 4, the module part 3 has a cable section 58. The free end of the cable section 58 has a second plug connection 59, which is internally arranged in the blister light. By means of the second plug connection 59, the module part 3 can be connected to the lighting unit 10. The second plug connection 59 is embodied as a two-pole FAA plug connection.

Due to the easily removable plug connections 56 and 59, by means of which the module part 3 is connected to the power supply line 6 and to the lighting unit 10 of the blister light 4, the module part 3 and the lighting unit 10 can be readily separated from the blister light 4 if maintenance, repair or replacement work is to be performed.

Figure 6:
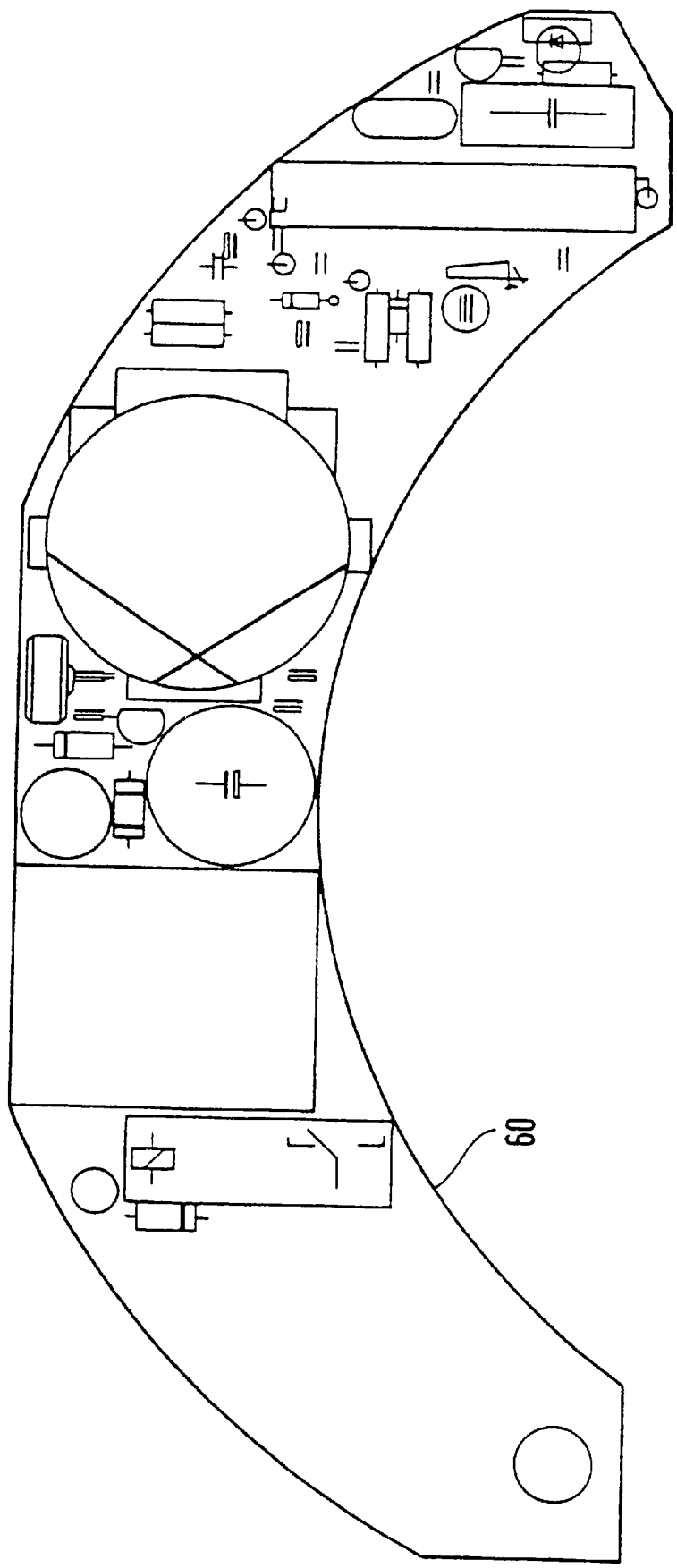
FIG. 6 shows a top view of a module part of the lighting system according to the invention.
Figure 7:
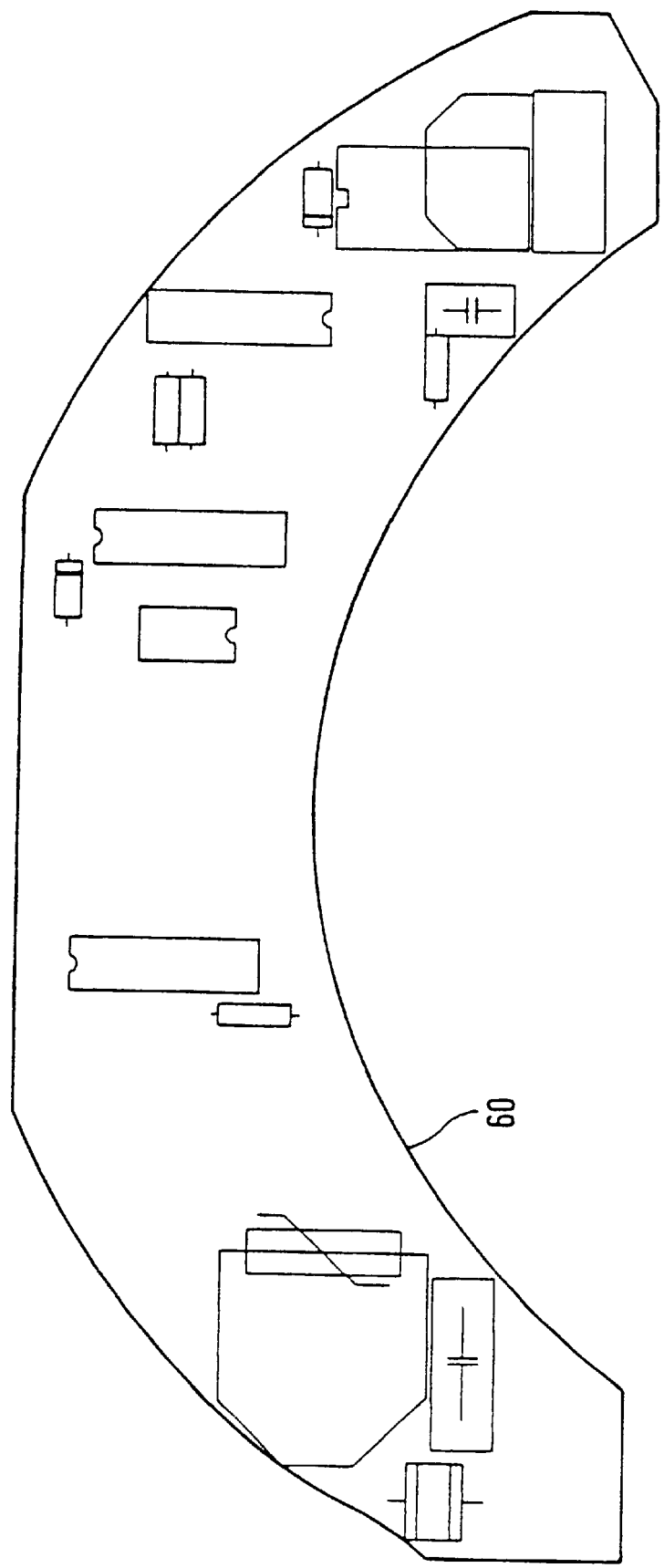
FIG. 7 shows a bottom view of the module part depicted in FIG. 6.

In FIGS. 6 and 7, a plan view and a view from beneath of a printed circuit board 60 are shown, wherein the printed circuit board includes the functional elements of the module part 3. As shown in FIGS. 6 and 7, the printed circuit board 60 has a curved structure and a shape of a sickle or similar to a sickle. Due to this sickle-shaped structure of the printed circuit board 60, the module part 3 can be disposed around the blister light 4, practically at the same level as the lighting unit 10 of the blister light 4. This results in an especially flat overall structure of the blister light 4.

Figure 8:
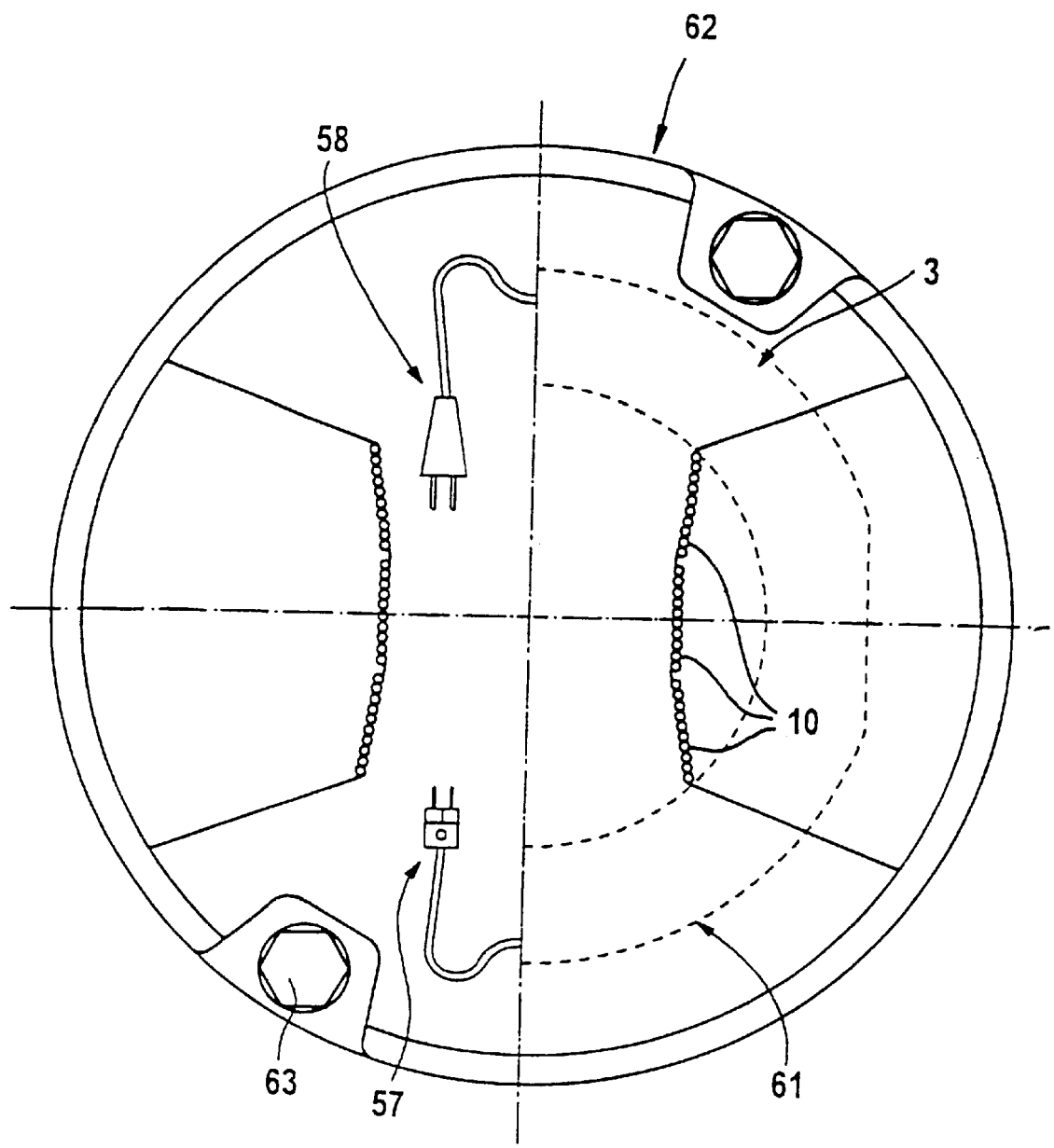
FIG. 8 shows a top view of an embodiment of a blister light of the lighting system according to the invention.

The printed circuit board 60, together with the functional elements disposed on it, is advantageously provided with a metallic housing 61, which is represented by a dotted line in FIG. 8. Moreover, the printed circuit board 60, together with the functional elements disposed on it, can be molded in plastic in order to exclude any interference due to moisture or the like.

The metallic housing 61 of the printed circuit board 60 or of the module part 3 has projecting cable ends 57 and 58, by means of which the module part 3 can be connected to the lighting unit 10 of the blister light 4 and to the power supply line 6. The blister light 4 is shown in FIG. 8, whereas the power supply line 6 is not shown in FIG. 8.

The blister light 4 has a housing 62, which can be lifted out of its seat below ground and which can be separated from the power supply line 6 by means of the first plug-in connector 56.

Figure 9:
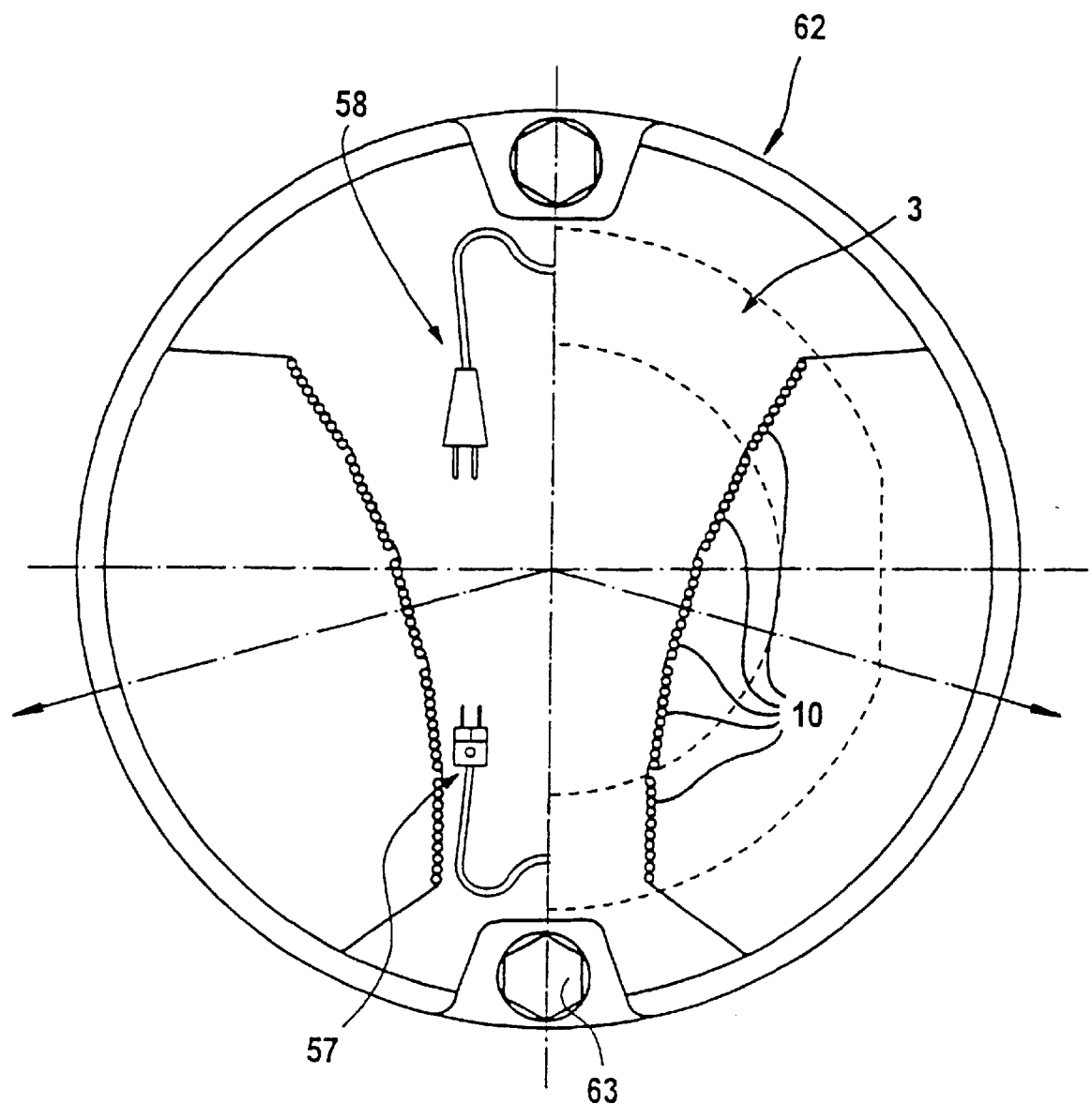
FIG. 9 shows a top view of a second embodiment of the blister light of the lighting system according to the invention.
Figure 10:
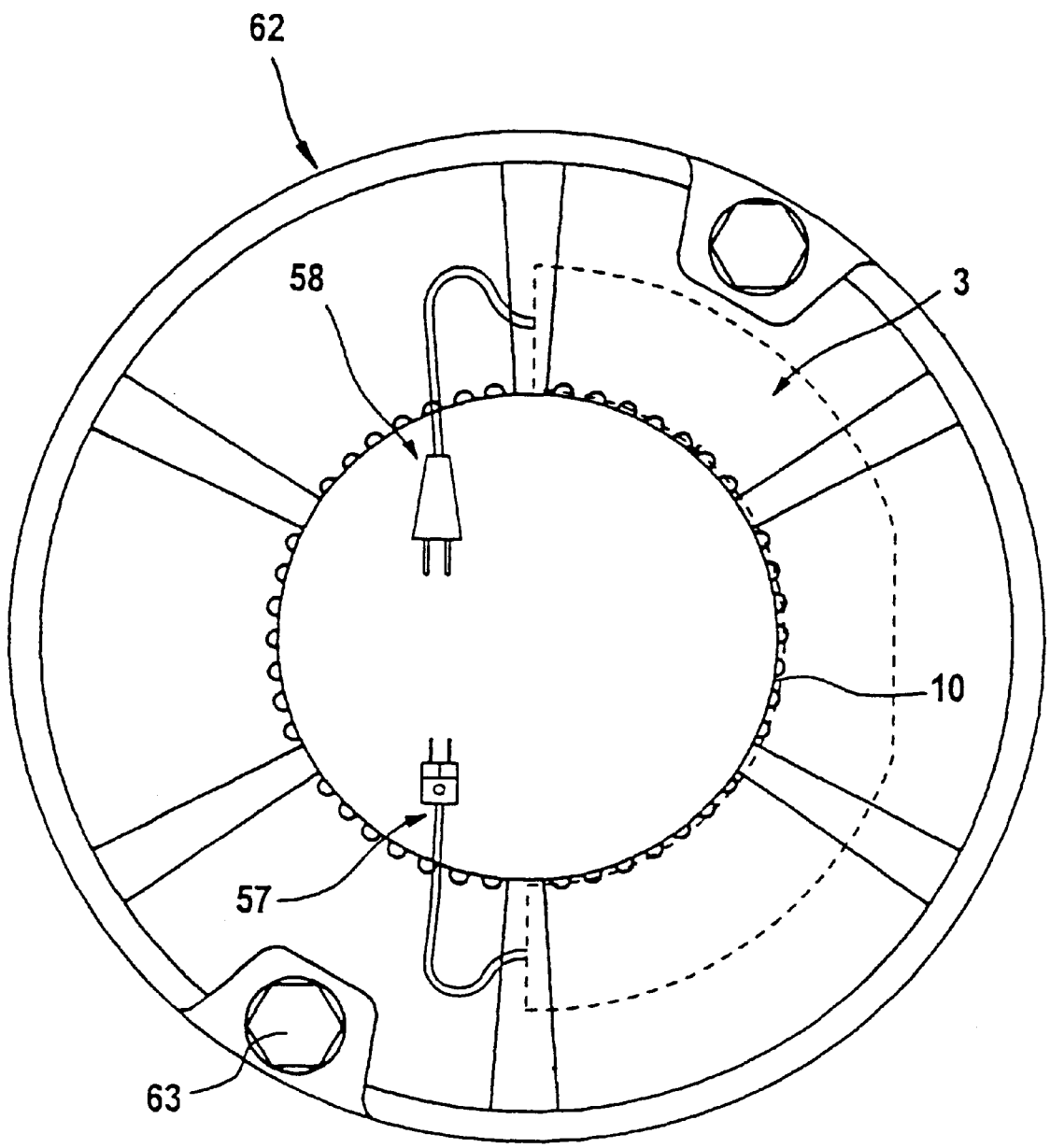
FIG. 10 shows a top view of a third embodiment of the blister light of the lighting system according to the invention.

FIGS. 8 to 10 show various embodiments of the blister light 4 of the lighting system according to the invention.

It is a common feature of these embodiments that the lighting unit 10 are embodied as light-emitting diodes (LEDs). In the embodiment of FIG. 8, the emission of light is accomplished by means of lighting unit 10, which is disposed in respective clusters of three lighting unit in anti-parallel direction. In the embodiment of FIG. 9, light is emitted at an obtuse angle. Finally, in the embodiment of FIG. 10, light is emitted in all directions.

Through the use of light-emitting diodes as the lighting unit 10, the power consumption of the blister lights 4 is significantly reduced and their life span is increased. Therein, these light-emitting diodes are disposed in a plurality of light-emitting diodes or in a certain cluster. As a consequence, along with the energy savings, a significant lengthening of the maintenance intervals of the blister light 4 is achieved.

The blister light represented in FIG. 10 has only one lighting unit cluster, which is embodied as a light that emits in all directions. The connection of the module part 3 to the power supply line 6, which is not represented in FIG. 10, is accomplished via the cable end 57. The connection of the module part 3 to the lighting unit 10 is accomplished via the cable end 58. As in the embodiment of FIG. 8, screw connections 63 engage the housing 62 of the blister light 4 with the underground in a removable fashion.

Figure 11:
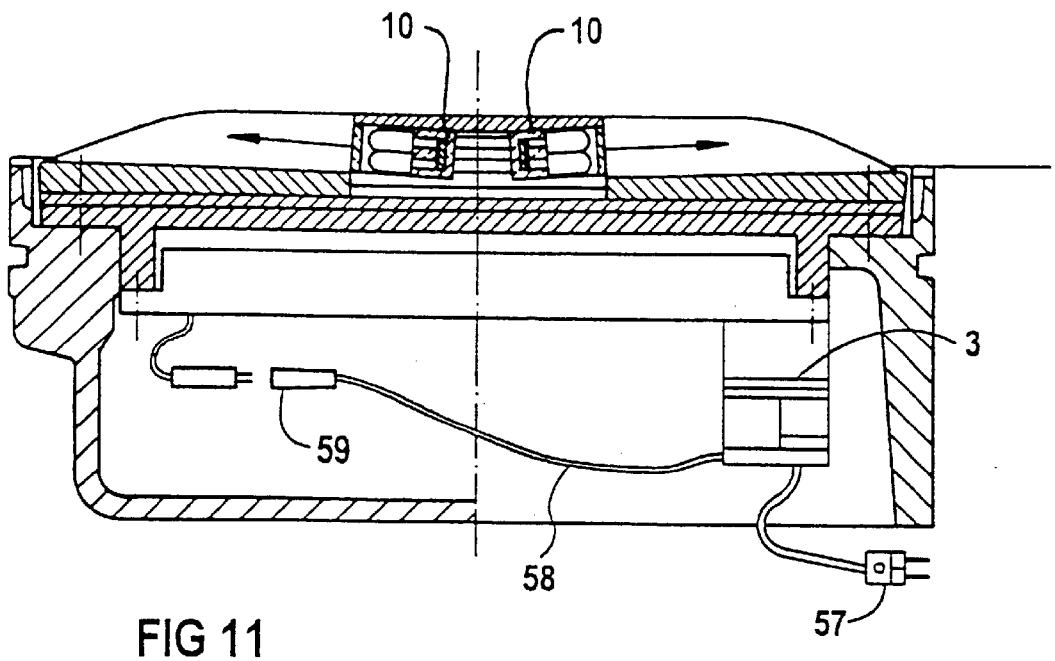
FIG. 11 shows a section view an embodiment of a blister light of the lighting system according to the invention.
Figure 12:
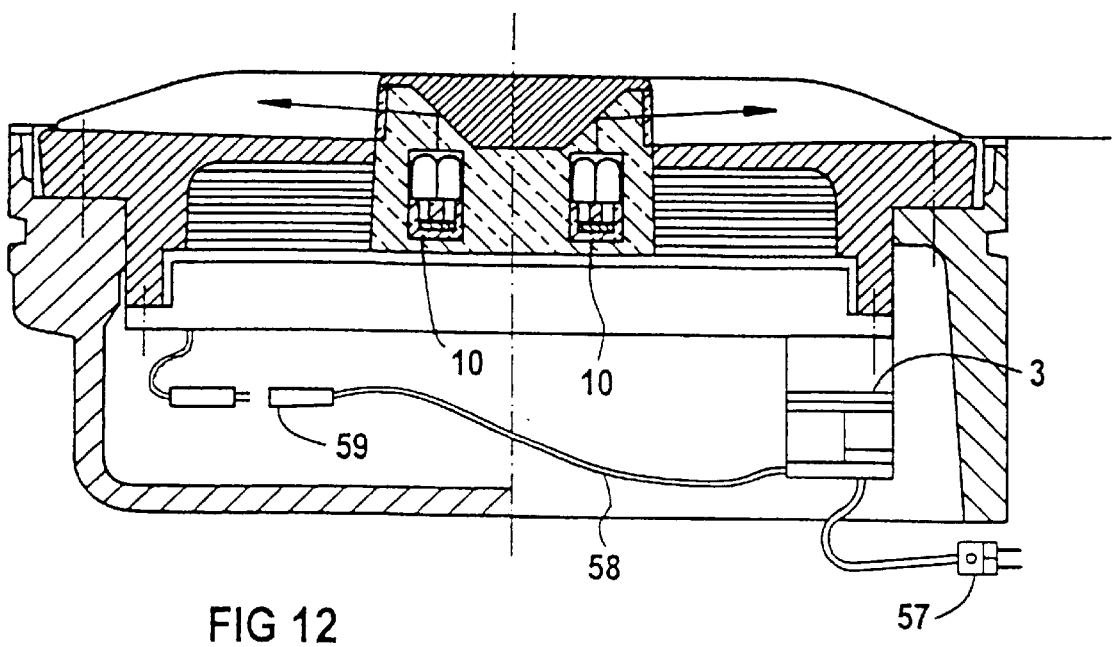
FIG. 12 shows a section view of another embodiment of a blister light of the lighting system according to the invention.

FIGS. 11 and 12 show different lighting units 10, which are embodied as light-emitting diodes (LEDs). In FIG. 11, the emission of light is performed directly from the light-emitting diodes. In FIG. 12, the emission of light is performed via a reflector.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A lighting system, comprising:
a plurality of blister lights each having at least one respective lighting unit;
a plurality of transceiver devices respectively having a microcontroller, wherein the transceiver devices are respectively associated with the lighting units; and
a central station having a transceiver part and a control computer;
wherein the central station is connected to the transceiver devices via a power supply line and a router; wherein the central station is configured to supply control commands to the transceiver devices; wherein each transceiver device is structured as a module part; wherein the module part has application-specific components, which are connected upstream from the microcontroller and the lighting unit of the blister light; wherein the application-specific components of the module part are disposed on a sickle-shaped printed circuit board; and wherein the module part is disposed next to the lighting unit.

2. The lighting system of claim 1, wherein the plurality of blister lights is arranged in groups of blister lights.

3. The lighting system of claim 1, wherein the application-specific components are selected from the group consisting of switching elements, monitoring elements, and regulating elements.

4. The lighting system of claim 1, wherein the module part is disposed around the lighting unit of the blister light.

5. The lighting system according to claim 1, wherein the at least one lighting unit is structured as at least one of a plurality of light-emitting diodes and a cluster of light-emitting diodes.

6. The lighting system according to claim 1, wherein the microcontroller of each transceiver device comprises:
an EEPROM;
a RAM;
a plurality of CPUs;
a clocking-and-control-block having a control block and a clock/timer block;
an application input/output block; and
a communications port;
wherein the EEPROM, the RAM, the plurality of CPUs, the application input/output block, and the communications port are connected to one another by an internal address bus and by an internal data bus; and wherein the EEPROM, the RAM, the plurality of CPUs, the application input/output block, the communications port, and the clocking-and-control block are connected to one another by a timing and control line.

7. The lighting system according to claim 6, wherein the EEPROM of the microcontroller has a memory capacity of at least 512 bytes, and wherein the EEPROM stores network parameters and application programs.

8. The lighting system according to claim 6, wherein the application input/output block of the microcontroller comprises:
at least one 16-bit load-register;
a counting device;
a buffer;
a timing source;
a plurality of 20 mA sink current pins; and
a plurality of programmable pull-ups.

9. The lighting system according to claim 6, wherein the microcontroller comprises a low-voltage detector circuit and a low-voltage reset circuit.

10. The lighting system according to claim 6, wherein the microcontroller includes an unambiguous, permanently stored identification number by which a current functional state of a lamp is linked to an address, which has a length of 48 bits and for which 6 bytes of the EEPROM are reserved.

11. The lighting system according to claim 1, wherein a respective one of the blister lights comprises an illumination intensity regulation circuit, which sets, via a pulse width modulation element, a predetermined desired value of a lighting unit current, and which readjusts an actual value of the lighting unit current.

12. The lighting system according to claim 11, wherein a respective blister light comprises a switching power supply, which has, as an isolating element, a toroidal core transformer, which determines, in cooperation with the pulse width modulation element, a transmitted power.

13. The lighting system according to claim 1, wherein each transceiver device comprises an isolating circuit, which, in case of currents above a predetermined maximum value or below a predetermined minimum value, causes a rapid isolation of a lighting unit circuit part and of the lighting unit of the blister light, and which eliminates the isolation after a termination of a disturbance, wherein the lighting unit circuit part and the lighting unit are connected downstream from the isolating circuit.

14. The lighting system according to claim 13, wherein each transceiver device comprises a measuring circuit, via which the isolation and a reconnection of the lighting unit is detected by the microcontroller.

15. The lighting system according to claim 14, wherein each transceiver device detects lighting unit functions via the measuring circuit, and wherein the lighting unit functions are input into the microcontroller, where actual lighting unit values are compared with desired lighting unit values.

16. The lighting system according to claim 5, wherein each transceiver device comprises a power circuit, which adapts, via the light-emitting diodes, a lighting unit current to a power supply voltage.

17. The lighting system according to claim 1, wherein the blister lights are, via a cable section, detachably connected to the power supply line.

18. The lighting system according to claim 17, wherein each blister light is structured to be installed in and removable from a seat recessed into the ground, and wherein each blister light is structured to be separated from the power supply line by the detachable connection.

19. The lighting system according to claim 17, wherein the module part of each blister light is connected to the power supply line by the detachable connection, and wherein the module part of each blister light is connected to the lighting unit of the blister light by an internal plug connection.

20. The lighting system according to claim 1, wherein the module part of each blister light comprises a metallic, grounded housing.

21. The lighting system of claim 1, wherein the lighting unit and the module part are both arranged in one housing.

22. The lighting system of claim 21, wherein the lighting unit and the module part are substantially similarly recessed in the housing.

23. The lighting system of claim 21, wherein the module part is arranged adjacent and below the lighting unit in the housing.

* * * * *